United States Patent [19]

Ruoff et al.

[11] Patent Number: 5,153,488
[45] Date of Patent: Oct. 6, 1992

[54] METHOD AND APPARATUS FOR CONTROLLING A DRIVE MOTOR OF A MOTOR VEHICLE WINDSCREEN WIPING SYSTEM

[75] Inventors: Harald Ruoff, Stuttgart; Raimund Leistenschneider, Sindelfingen, both of Fed. Rep. of Germany

[73] Assignee: Daimler-Benz Aktiengesellschaft, Fed. Rep. of Germany

[21] Appl. No.: 525,680

[22] Filed: May 21, 1990

[30] Foreign Application Priority Data

May 20, 1989 [DE] Fed. Rep. of Germany ....... 3916549

[51] Int. Cl.⁵ .............................................. B60S 1/08
[52] U.S. Cl. .................. 318/446; 318/444; 318/DIG. 2
[58] Field of Search ............. 250/443, 444, 445, 446, 250/DIG. 2; 15/250 C, 250.12, 250.16, 250.17

[56] References Cited

U.S. PATENT DOCUMENTS

| 4,348,726 | 9/1982 | Igarashi et al. | |
| 4,389,603 | 6/1983 | Kogawa et al. | 318/443 |
| 4,588,935 | 5/1986 | Kaneiwa et al. | 318/483 |
| 4,625,157 | 11/1986 | Phillimore | 318/DIG. 2 X |

FOREIGN PATENT DOCUMENTS

| 1530979 | 9/1970 | Fed. Rep. of Germany . | |
| 2403311 | 7/1975 | Fed. Rep. of Germany . | |
| 2503767 | 4/1976 | Fed. Rep. of Germany . | |
| 3021877 | 12/1981 | Fed. Rep. of Germany . | |
| 55-156737 | 12/1980 | Japan | 15/250.12 |
| 55-164539 | 12/1980 | Japan | 15/250.12 |
| 56-21932 | 2/1981 | Japan | 15/250.12 |
| 56-60749 | 5/1981 | Japan | 15/250.12 |
| 59-149843 | 8/1984 | Japan | 15/250.12 |
| 62-26148 | 2/1987 | Japan | 15/250.12 |

Primary Examiner—Bentsu Ro
Attorney, Agent, or Firm—Evenson, Wands, Edwards, Lenahan & McKeown

[57] ABSTRACT

A method and apparatus for manually controlling a windscreen wiper drive motor in a motor vehicle in several speed steps, by which the drive motor can also be automatically switched from a manually switched-on speed step into a lower speed step when the speed passes through a predetermined threshold value of the motor vehicle travelling speed from a higher travelling speed. The apparatus and method provide automatic switching of the drive motor from each manually switched-on speed step into a lower speed step when the speed passes through the threshold value, cancellation of the current automatic switching until the speed again passes through the threshold value from a higher travelling speed when the control switch has been operated below the threshold value of the travelling speed and after the drive motor has been automatically switched into a lower speed step, and switching-on of each speed step of the drive motor selected by this operation of the control switch. The automatically switched-on lower speed step can be the next lower one or the system can switch from all switched-on speed steps to a single slow one.

8 Claims, 2 Drawing Sheets

METHOD AND APPARATUS FOR CONTROLLING A DRIVE MOTOR OF A MOTOR VEHICLE WINDSCREEN WIPING SYSTEM

BACKGROUND AND SUMMARY OF THE INVENTION

The present invention relates to a method and apparatus for controlling an electric drive motor of a motor vehicle windscreen wiping system in at least two different speed steps by a manually-operated multi-step windscreen wiper control switch, in which the drive motor can be automatically switched from at least one speed step switched on by the control switch into a lower speed step independently of the control switch, when the travelling speed of the vehicle passes through a predetermined threshold value from a higher speed.

A method can be derived from the operation of a known switching arrangement (German Patent Document DE 30 21 877 A1) for the intermittent operation of a windscreen wiper motor of motor vehicles. In this known circuit arrangement, the operation or the wiping interval period of the wiper motor in one of three operating positions of the windscreen wiper control switch depends on a threshold value of the travelling speed. Above the threshold value, the wiping interval pause becomes zero, that is to say the windscreen wiper motor operates in continuous mode. Below the threshold value, the wiping interval pause assumes a particular value which is different from zero and which can be fixed or manually/automatically variable.

Due to this purely speed- or also rotational speed-dependent automatic switching to a next lower wiping speed, however, the requirements of the vehicle user for clear vision even when his vehicle is travelling more slowly or standing still is not always adequately met under disadvantageous circumstances, for example with a rapidly changing density of precipitation.

Although the vehicle user can manually set a different position of the control switch at any time, the automatic switching to a slower wiper speed is then no longer available with the known circuit arrangement.

If the automatic wiping speed switching of the known circuit arrangement were to be applied to all speed steps of the windscreen wiper drive motor, it would no longer be possible at all, for example, to switch to the fastest wiper step below the travelling speed threshold value.

It is also known (from German Patent Document DT 25 03 767 C2) to switch a drive motor of a windscreen wiping system of a motor vehicle from continuous to intermittent operation, that is to say to the next lower speed step in dependence on a threshold value of its current consumption. With a high current consumption, the system concludes that there is little wetting of the area to be wiped, that is to say a small quantity of impinging rain, so that the system can then automatically switch to intermittent operation for relieving the vehicle user. By the same token, the vehicle user can also arbitrarily activate the windscreen wiper or wipers within such an automatically switched-on wiping interval by means of a separate (foot) switch while shortening the interval.

It is known (German Patent Documents DT-OS 1 530 979, DE 35 27 406 A1) to vary the duration of wiping intervals of a windscreen wiping system continuously in dependence on the travelling speed of a vehicle, in which arrangement short wiping intervals up to continuous operation are generated with a relatively high travelling speed and longer wiping intervals are generated with a relatively low travelling speed. Although it is not necessary to provide a control switch having several switch positions in these arrangements, the vehicle driver also does not have any direct influence on the operation of the windscreen wiping system.

A control device for the continuous and/or intermittent operation, particularly of windscreen wipers, is known (DT 24 03 311 A1) which makes it possible, on the one hand, to read in and to store wiping intervals of a windscreen wiper by successively operating the windscreen wiper control switch. In this known device, the windscreen wiper can be switched from intermittent (interval) mode to continuous mode by this means, in that the control switch is briefly switched to a second wiper step or, the control switch is switched off and on again twice in succession for a short time or, the control switch is switched off and on again once during the wiper run.

In this non-generic control device, in contrast, an automatic switching which is dependent on the travelling speed from one wiper speed step to the next lower, is not provided.

Because continuous operation of the wiper should be automatically guaranteed when the control unit is switched on by the vehicle user, there is also no predetermined interval period stored for the intermittent operation. Instead, it must be read in and stored again each time, as required, by appropriately operating the control switch.

An object of the present invention is to provide a method in which the driver can override the automatic operation of the control circuit in a simple manner and provide a device that can carry out this method.

This and other objects are achieved by the present invention which provides a method for controlling an electric drive motor of a motor vehicle windscreen wiping system in at least two different speed steps by a manually-operated multi-step windscreen wiper control switch, the drive motor being automatically switchable from at least one speed step switched on by the control switch when a travelling speed of the motor vehicle passes through a predetermined threshold value from a higher travelling speed into a lower speed step independently of an operation of the control switch, and comprises overriding the automatic switching by switching on a speed step that is selected by manual operation of the control switch from the automatically switched-on lower speed step.

The objects are also achieved by the present invention which provides a device for controlling a motor vehicle windscreen wiping system in multiple speed steps. The device comprises a windscreen wiper control switch which is manually switchable into multiple operating positions, and means for controlling a drive motor into speed steps selectable by the operating positions of the control switch. A threshold value switch is supplied with an electrical signal that is proportional to the travelling speed of the motor vehicle, and has an output coupled to an input of the means for controlling, this threshold switch providing a threshold value switching signal which, when it passes through a predetermined threshold value in a particular direction, causes the means for controlling to automatically switch the drive motor from a currently switched-on speed step into a lower speed step. The means for controlling includes a switching device, coupled to the control switch and activatable by manual operation of the control switch when the travelling speed of the vehicle is below the threshold value of the travelling speed. The switching device cancels a current automatic switching of the speed step of the drive motor to the next lower speed step and the control switch is manually operated below the threshold value, and switches on the speed step of the drive motor selected by the manual operation of the control switch.

When the method according to the present invention is applied or when using the device according to the present invention, the vehicle user can override the intervention of the automatic switching system as desired by an arbitrary actuation of the control switch for the windscreen wiper drive motor. Thus, the driver can either switch to a different wiper speed step, which is then not affected by the automatic switching system which is expanded to all speed steps, or can manually reactivate the speed step which was deactivated due to the automatic switching after the speed had dropped below the predetermined travelling speed value. Any such manual intervention has priority until the speed again drops below the threshold value of the travelling speed from above.

Other objects, advantages and novel features of the present invention will become apparent from the following detailed description of the invention when considered in conjunction with the accompanying drawings.

DETAILED DESCRIPTION OF THE DRAWINGS

Figure 1:
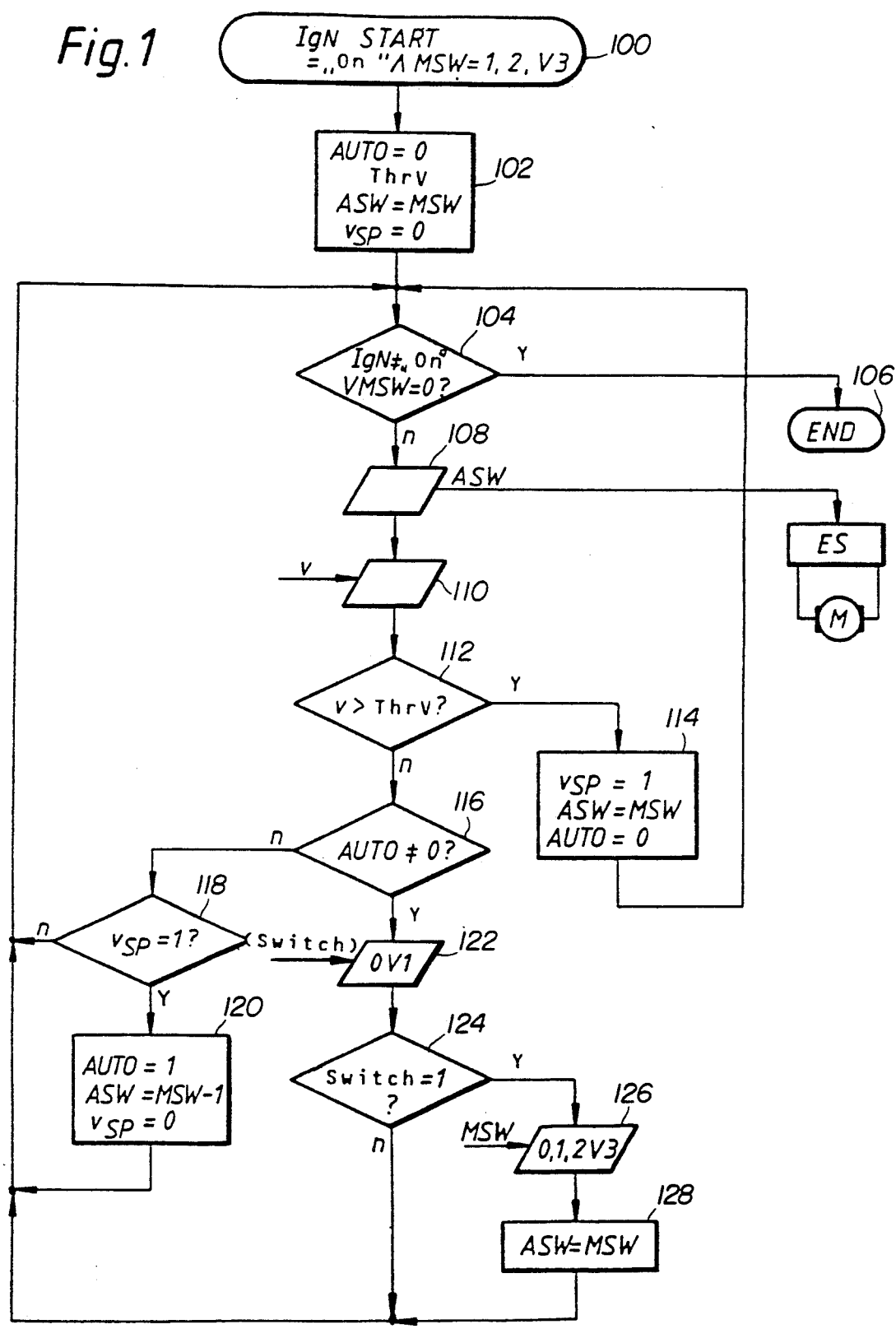
FIG. 1 shows a schematic flowchart of the method according to an embodiment of the present invention.

A flowchart in FIG. 1 STARTs (100) with switching on the ignition switch "Ign" in its "ON" position and windscreen wiper control switch "MSW" (for manual windscreen wiper setting), set in one of the numerical values 1, 2 or 3 corresponding to the manually selectable wiper speeds of the control switch.

Next, a travelling speed threshold value "ThrV" is set (102) {for example to 40 km/h}. A binary state variable "AUTO" as indicator for the windscreen wiper operation influenced by the automatic switching is set {to 0}. A control variable ASW—for Activation Screen Wiper—for the windscreen wiper drive motor is set to the same numerical value as the MSW manual input, i.e. that is to say 1, 2, or 3. A stored binary travelling speed Vsp(1 for Vsp>ThrV; O for Vsp<or=ThrV) is set {to 0}.

In each circle of the loops now beginning, the ignition switch Ign and the control switch MSW of the vehicle are repeatedly polled ("Switch polling"). As soon as one of them is switched off [Ignition "On" or MSW=0] (104), the process branches to the right to the END (106).

If both switches are switched on, the windscreen wiper drive motor is switched (108) to the speed step which corresponds to the numerical value of ASW [output of ASW to a output stage "ES"] predetermined (or automatically set) by MSW.

The travelling speed v is then input (110) and compared with the threshold value ThrV (112).

In step 112, [v>ThrV] if the current value of v is greater than the threshold value, the flow branches to the right. Each crossing of the threshold value is stored by setting the store $v_{sp}$ to the value 1 (114). This is necessary because the automatic switching of the drive motor is to be effective only when the speed passe through the travelling speed threshold value from above. For the same reason, AUTO is always reset to 0 in this branch (114). Furthermore, ASW is reset to the value of MSW before the return to the switch polling in each cycle of this branch.

In step 112, [v≦Thrv] if the current travelling speed value is smaller than or equal to the threshold value, the next polling relates to whether the state variable AUTO is already set (116).

In step 116, [AUTO=0] if AUTO=0, the flow branches to the left for a polling of the store $v_{sp}$ (118), in order to check whether the speed has passed through the travelling speed threshold value from above.

In step 118, when $v_{sp}$=0, the flow returns to the switch polling of step 104.

However, when the store $v_{sp}$ has already been set, the binary state variable AUTO is set to 0, and the control variable ASW for the windscreen wiper drive motor is reduced by one compared with the numerical value of the windscreen wiper control switch. Furthermore, the store $v_{sp}$ is again set to zero so that no repeated automatic switching can occur (step 120). After that, the flow returns back to the switch polling (step 104).

If the switches have not been switched off in the meantime, the drive motor is now switched to the next lower speed step corresponding to the reduced value of ASW.

In step 116, if the drive motor has already been automatically switched to a next lower speed step (AUTO=1), the system now checks (122) with reference to the content of a further memory switch whether there has been a switching process at the control switch with set store $v_{sp}$ and with a travelling speed which is below the threshold value ThrV. When Switch=0, the current speed step of the drive motor remains unchanged and the flow returns to switch polling (104). When Switch=1, the control variable ASW is reset to the numerical value of the variable MSW (126, 128). This step carries out the manual overriding of the automatic switching of the windscreen wiper speed step in accordance with the present invention.

The number of speed step of the windscreen drive motor does not play any role in implementing the invention.

With a slight modification of the flow chart shown, automatic switching also becomes feasible in such a manner that the system switches back from all speed steps to a single lower one which would then be preferably a slow interval step. The calculation step ASW=MSW−1 only needs to be replaced by a value allocation ASW=N (=the numerical value corresponding to the speed step to be switched through).

Figure 2:
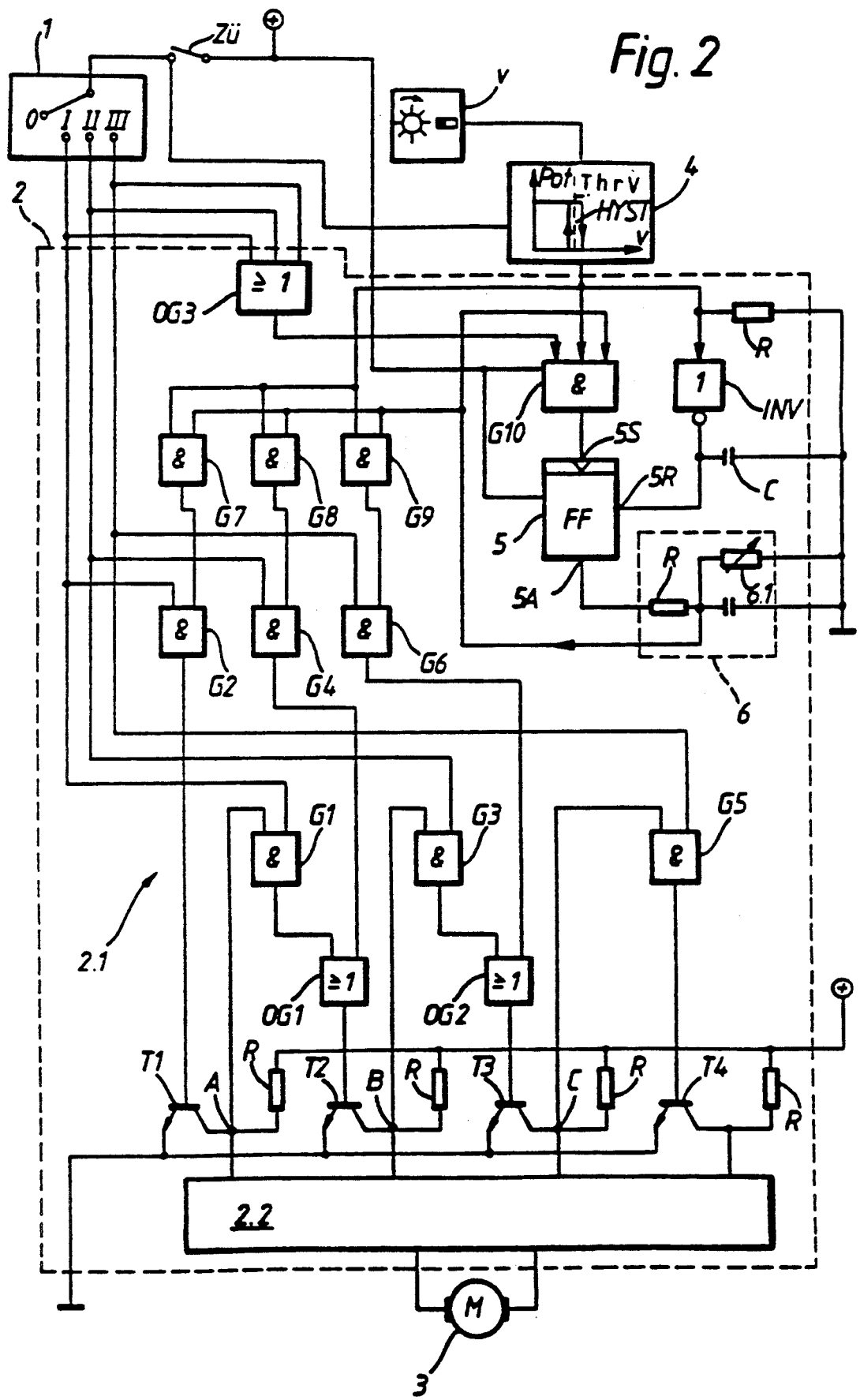
FIG. 2 shows a schematic circuit diagram of a device according to an embodiment of the present invention.

FIG. 2 shows a schematic circuit example of a device constructed in accordance with an embodiment of the present invention which is suitable for carrying out the method according to the invention. A windscreen wiper control switch 1 is connected to positive potential via an ignition switch Ign. The control switch 1, in addition to its off position 0, has the three usual operating positions with fixed contacts I for an intermittent step, II for a slow step and III for a fast windscreen wiper speed step. The control switch 1 or its fixed contacts I to III are connected to an electronic control device 2 which has a network 2.1 of logic gates and further components, the function of which will be described in detail later, and an output stage 2.2. As determined by the operating positions of the control switch 1 or the logic signal combinations in the network 2.1, the electronic control device 2 activates an electric drive motor 3 for one or more windscreen wipers (not shown) in various speed steps for continuous or intermittent operation.

A threshold value switch 4 is also connected to the control device 2 for transferring threshold value switching signals. The threshold value switch 4, which is also supplied with voltage via the ignition switch Ign, is supplied with a travelling-speed-proportional signal of a travelling-speed sensor v, for example an electronic tachometer, as input signal. At a defined threshold value of the travelling speed, indicated by ThrV, which is, for example, about 40 km/h, the threshold value switch 4 generates: a negative switching edge when passing through the threshold value in an upwards direction; a positive switching edge when passing through the threshold value in a downwards direction, a certain hysteresis HYST being provided between upwards and downwards passing through the threshold value.

The network 2.1 contains a current path to the output stage 2.2 for each of the fixed contacts I, II, and III. The fixed contact I is directly connected to one input each of two AND gates G1 and G2. The fixed contact II is directly connected to one input each of two AND gates G3 and G4. The fixed contact III is directly connected to one input each of two AND gates G5 and G6. The outputs of the AND gates G1 and G4 and G3 and G6 are combined via one OR gate OG1 and OG2 each.

The outputs of the gates G2, OG1, OG2 and G5 are connected to one driver stage each at the bases of transistors T1, T2, T3 and T4 respectively. The collector of each transistor T1, T2, T3, T4 is connected via a resistor R to positive potential and the emitter of each transistor is connected to ground. At the collectors of the transistors T1, T2, T3, connections to the output stage 2.2 are provided at junctions A, B and C, respectively. The electrical potential at the junctions A, B and C, respectively, which depends on the switching state of the transistors T1 to T3, is in each case connected to the second inputs of the AND gates G1, G3 and G5.

To the second inputs of the AND gates G2, G4 and G6, outputs of AND gates G7, G8 and G9, respectively, are connected. The first inputs of gates G7, G8 and G9 are connected to the output of the threshold value switch 4 while their second inputs are each connected via an R-C-section 6, which has a signal delay effect, to the output 5A of a storage circuit 5 constructed, for example, as a flip-flop (FF). The R-C-section 6 has an adjustable discharge resistor 6.1. The storage circuit 5 exhibits a static RESET-input 5R. This is controlled via an inverter INV from the output of the threshold value switch 4. The connection between the inverter output and the RESET-input 5R is also connected to a capacitance C, which has a signal delay effect, while the input of the inverter INV is also connected to ground via a resistor R. The output of a further AND gate G10 having three inputs is connected to dynamic SET input 5S of the storage circuit 5.

The first input of the AND gate G10 is connected to the output of the threshold value switch 4. The second output of the AND gate G10 is connected to all the fixed contacts I, II and III of the control switch via an OR gate OG3. The third input of the AND gate G10 is connected via the R-C section 6 to the output 5A of the storage circuit 5.

The operations of the embodiment of the invention of FIG. 2 will now be described. To begin with, the operation of the storage circuit 5 and its immediate periphery will now be briefly described to provide a better understanding of the device.

In principle, the storage circuit 5 is in the static RESET state both when the ignition is switched off and when the travelling speed is below the threshold value. As indicated, the supply voltage of the inverter INV and of the storage circuit 5 must therefore be continuously at positive potential. In the RESET stage, there is positive potential at output 5A of the storage circuit 5. The storage circuit 5 will be switched to the SET state, in which the output 5A becomes floating, only when:
a) positive potential is present at the inverter input,
b) there is a positive switching edge at the output of the AND gate G10 and
c) this positive switching edge is generated by a switching process at the control switch 1.

This is because the capacitance C at the inverter output ensures that a change of the inverter output signal from positive potential to ground is in every case delayed with respect to a positive switching edge of the threshold value switch 4 so that a positive switching edge at the output of the AND gate G10, only resulting from the latter, cannot lead to the storage circuit 5 being set because of the static RESET signal.

In the off position of the control switch 1, all driver transistors T1 to T4 are cut off, i.e there is positive potential at the junctions A, B and C. Below the travelling-speed threshold value, the threshold value switch 4 emits a signal with positive potential, while its output is at ground potential for traveling speed above the threshold value. In consequence, the AND gates G7, G8 and G9, and thus also the AND gates G2, G4 and G6, are inhibited at speeds above the threshold value.

The vehicle user is now assumed to switch the control switch 1 manually into an operating position, the travelling speed of the motor vehicle being assumed to be greater than the threshold value. The positive potential present at its switching contact is thus applied to one of the fixed contacts I, II or III.

With the assumed switching to the fixed contact I, positive potential is applied to one input each of the AND gates G1 and G2. The OR gate OG3 conducts and applies positive potential to one input of the AND gate G10. Since now both inputs of the AND gate G1 are at positive potential (from the junction A and from the fixed contact I), the transistor T2 conducts and the output stage 2.2 activates the drive motor 3 for intermittent operation.

In the same manner, the slow- and the fast-period speed step of the drive motor 3 can be switched on via the fixed contacts II and III. To do this the transistor T2 or T3, which is associated with the next lower speed step, is in each case driven to cut off by switching the AND gates G1, G3 and G5 respectively, and the transistor associated with the speed step to be switched on, T3 and T4, respectively, is driven to conduct.

If the travelling speed is then lowered below the threshold value during wiper operation, the output of the threshold value switch 4 switches from ground to positive potential.

The storage circuit 5 still remains in the RESET state for the above-mentioned reasons. In other words, to the positive signal from the output 5A of the storage circuit 5, already present at one input of the AND gates G7, G8 and G9, is added the output signal of the threshold value switch 4, also at positive potential. Thereby, the AND gates G7, G8 and G9 are now switched to conduct. In consequence, the particular one of the AND gates G2, G4 or G6, that has one input already at positive potential from one of the fixed contacts of the control switch 1, is also switched to conduct. In the present example, the fixed contact I has been selected for intermittent operation s that the AND gate G2 can now switch to conduct. Following this, the transistor T1 is driven to conduct and the positive potential at the junction A disappears. The AND gate G1 is inhibited, as is the transistor T2, and the drive motor 3 is automatically switched to the next lower speed step, that is to say to standstill in this case.

This state, which deviates from the manually set operating position of the control switch 1, is maintained until either the travelling speed becomes greater again than the threshold value, or the vehicle user operates the control switch 1 in some direction.

When the speed passes through the travelling speed threshold value from below, the threshold value switch 4 again switches its output from positive potential to ground. Thus, the AND gate G10 is immediately inhibited and the input of the inverter INV is connected to ground. With the inhibiting of the AND gates G7, G8 and G9 following from this, the operating state of the drive motor 3, which was switched on at the control switch 1 before the speed passed the travelling speed threshold value, is restored again—G2 and T1 are inhibited, G1, OG1 and T2 are switched to conduct and the drive motor 3 goes into interval mode. The storage circuit 5 is again switched into its static RESET sate.

If the vehicle user operates the control switch 1 in some direction while the vehicle is at a travelling speed which is below the threshold value, the input of the AND gate G10 which is connected with the non-overlapping fixed contacts I, II and III, becomes floating for a brief period during the switching of the switch contact of the control switch 1. The AND gate G10 is inhibited and when it is switched to conduct again, which occurs when the control switch 1 is switched into another operating position or into the same operating position as before, again generates a positive switching edge at the dynamic SET input of the storage circuit 5. Because, however, there is now ground present at the RESET input of the storage circuit 5, because the inverter input already has positive potential from the threshold value switch 4, the storage circuit 5 is placed into the SET state. In this connection, the R-C-section 6 has the effect that the AND gate G10 remains switched to conduct until the storage circuit 5 has reliably switched. In the SET state of the storage circuit, its output 5A is floating so that the AND gates G7, G8 and G9 are now inhibited until the travelling speed threshold value is exceeded again and the storage circuit 5 is switched back into the RESET state due to the negative switching edge of the threshold value switch 4.

Each switching process at the control switch 1 which is undertaken below the travelling-speed threshold value after this threshold value has been passed through once from above, thus has the consequence in the circuit arrangement described that the automatic switching of the drive motor 3 into the next lower speed step effected by the threshold value switch 4 via the network 2.1, is canceled and the speed step now actually selected is switched on.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for controlling an electric drive motor of a motor vehicle windscreen wiping system having at least two different speed levels and a manually operated multi-step windscreen wiper control switch, each wiper speed level being activatable by a respective control switch position independently of the vehicle travelling speed, and said drive motor being automatically switched from at least one speed level activated by the control switch into a lower speed level activated independently of an operation of the control switch, when a travelling speed of the motor vehicle passes through a predetermined threshold value from a higher vehicle travelling speed into a lower vehicle traveling speed, comprising the step of:

overriding the automatically activated lower speed level, causing it to be replaced with the speed level defined by said control switch position independently of the actual vehicle travelling speed, by manually operating said control switch from one position to another position, followed by placing said control switch in a position defining a desired speed level.

2. The method of claim 1, further comprising:

automatically switching the drive motor from each manually switched-on speed step into a lower speed step when the vehicle travelling speed passes through the threshold value from a higher vehicle travelling speed;

registering each operation of the control switch carried out below the threshold value of the vehicle travelling speed and after the automatic switching of the drive motor into a lower speed step is completed; and switching-on of each speed step of the drive motor selected by the manual operation of the control switch, when the current automatic switching is canceled, until the travelling speed again passes through the threshold value of the travelling speed from a higher vehicle travelling speed.

3. The method of claim 2, further comprising automatic switching of each switched-on speed step to the next lower one when the vehicle travelling speed passes through the threshold value of the vehicle travelling speed from a higher traveling speed.

4. The method of claim 2, further comprising automatic switching of each switched-on speed step to a single particular lower one when the vehicle traveling speed passes through the threshold value of the vehicle travelling speed from a higher travelling speed.

5. A device for controlling a motor vehicle windscreen wiping system in multiple speed steps, comprising:

a windscreen wiper control switch which is manually switchable into multiple operating positions;

means for controlling a drive motor into speed steps selectable by the operating positions of the control switch;

a threshold value switch supplied with an electric input signal that is proportional to the travelling speed of the motor vehicle, and having an output coupled to an input of the means for controlling, said threshold value switch providing a threshold value switching signal which, when said electric input signal passes through a predetermined threshold value in a particular direction, causes said means for controlling to automatically switch the drive motor from a currently switched-on speed step into a lower speed step;

wherein the means for controlling includes a switching device, coupled to the control switch and activatable by manual operation of the control switch when the travelling speed of the vehicle is below the threshold value of the travelling speed, said switching device canceling a current automatic switching of the speed step of the drive motor to the next lower speed step when the control switch is manually operated while said electronic input signal is below the threshold value, and switching on the speed step for the drive motor selected by the manual operation of the control switch.

6. The device according to claim 5, further comprising a storage circuit coupled to the control switch and the threshold value switch, said storage circuit triggering a switching pulse that cancels the switching of the drive motor into a lower speed step only with manual operation of the control switch when the vehicle travelling speed is below the threshold value and after the threshold value has previously been exceeded.

7. The device according to claim 6, wherein the means for controlling has an output stage that sets the speed steps of the drive motor, and further comprising a network of logic gates in which network output signals of the control switch, of the threshold value switch, and of the storage circuit are logically combined with one another, the network having a driver stage for each speed step of the drive motor.

8. The device according to claim 7, wherein the storage circuit includes a dynamic SET input, a static or RESET input and an output, the threshold value switch has hysteresis which generates a positive switching edge when the vehicle travelling speed passes downward through the threshold value of the travelling speed, and further comprising:

an OR gate that has an output and inputs coupled to fixed contacts of the control switch;

a timing section coupled to the output of the storage circuit;

an AND gate having an output coupled to the SET input of the storage circuit, said AND gate having three inputs, a first of these inputs being coupled to the output of the OR gate, a second of these inputs being coupled to an output of the threshold value switch, and a third of these inputs being coupled to the timing section; and a capacitor and an inverter coupled between the output of the threshold value switch and the RESET input of the storage circuit.

* * * * *